US010130048B2

(12) United States Patent
Lipani

(10) Patent No.: US 10,130,048 B2
(45) Date of Patent: Nov. 20, 2018

(54) PLANT-PROTECTION CAGE WITH HARVESTING AND PRODUCE-RINSING DOME

(71) Applicant: John D. Lipani, New Hope, PA (US)

(72) Inventor: John D. Lipani, New Hope, PA (US)

(*) Notice: Subject to any disclaimer, the term of this patent is extended or adjusted under 35 U.S.C. 154(b) by 208 days.

(21) Appl. No.: 15/047,582

(22) Filed: Feb. 18, 2016

(65) Prior Publication Data

US 2017/0238479 A1 Aug. 24, 2017

(51) Int. Cl.
| | | |
|---|---|---|
| *A01G 13/02* | (2006.01) | |
| *A01G 13/10* | (2006.01) | |
| *A01G 27/00* | (2006.01) | |
| *A01M 29/16* | (2011.01) | |
| *A01M 29/12* | (2011.01) | |
| *A01M 29/08* | (2011.01) | |
| *A01G 13/04* | (2006.01) | |
| *A01G 27/04* | (2006.01) | |

(52) U.S. Cl.
CPC ............ *A01G 13/10* (2013.01); *A01G 13/04* (2013.01); *A01G 27/003* (2013.01); *A01G 27/005* (2013.01); *A01G 27/04* (2013.01); *A01M 29/08* (2013.01); *A01M 29/12* (2013.01); *A01M 29/16* (2013.01)

(58) Field of Classification Search
CPC .......... A01G 9/12; A01G 13/04; A01G 13/10; A01G 13/0212
USPC ............ 47/20.1, 21.1, 24.1, 31, 31.1, 45, 70
See application file for complete search history.

(56) References Cited

U.S. PATENT DOCUMENTS

| 1,739,426 A | 12/1929 | Stripling | |
|---|---|---|---|
| 2,914,022 A | 11/1959 | Hinton | |
| 3,754,676 A * | 8/1973 | Box .................. | B65D 11/14 |
| | | | 119/437 |
| 3,803,759 A | 4/1974 | Heinecke | |
| 4,160,340 A | 7/1979 | Levett | |
| 4,304,068 A * | 12/1981 | Beder .................. | A01G 13/043 |
| | | | 135/117 |
| 4,392,326 A | 7/1983 | Boria | |

(Continued)

OTHER PUBLICATIONS

Andrew Grace. Bamboo Cloches. retrieved from www.giftsandgardens.com/bamboo-cloche.htm on Nov. 11, 2015.

(Continued)

*Primary Examiner* — David J Parsley
*Assistant Examiner* — Danielle A Clerkley
(74) *Attorney, Agent, or Firm* — David R. Rigney

(57) ABSTRACT

Most of the time, the disclosed plant husbandry and food preparation apparatus encloses a garden plant, such that the plant is protected on all sides from animals. It may comprise a planter in which the plant is grown, a cage that is attached to the lip of the planter, and a dome containing apertures, which is seated atop the cage. The seated dome may be opened, while the dome is still attached to the cage, allowing the gardener to harvest produce. The opened dome is configured for use as a receptacle into which the harvested produce is deposited. The dome is also configured to be effortlessly detachable from the remainder of the apparatus, so that produce within it may be conveniently transported and rinsed. The dome may also be configured to serve as a strainer/steamer basket and as support for an auxiliary irrigation and/or animal deterrence system.

23 Claims, 7 Drawing Sheets

(56) References Cited

U.S. PATENT DOCUMENTS

| | | | | |
|---|---|---|---|---|
| 4,631,861 | A | * | 12/1986 | Wuthrich ............... A01G 9/12 47/70 |
| 4,760,666 | A | * | 8/1988 | Han .................... A01G 27/003 47/67 |
| 5,009,192 | A | | 4/1991 | Burman |
| 5,276,996 | A | * | 1/1994 | Lee ...................... A01G 9/12 47/45 |
| 5,412,905 | A | | 5/1995 | Allison |
| 5,669,177 | A | * | 9/1997 | Frounfelker ......... A01G 13/04 47/29.2 |
| 5,892,446 | A | | 4/1999 | Reich |
| 6,012,249 | A | | 1/2000 | Cheney |
| 6,061,953 | A | | 5/2000 | Chubb |
| 6,158,169 | A | * | 12/2000 | Goldburt ............... A01G 9/16 47/17 |
| 6,185,866 | B1 | | 2/2001 | Enfaradi |
| 6,418,663 | B1 | | 7/2002 | Smith |
| 6,640,491 | B1 | | 11/2003 | Fox |
| 6,976,334 | B1 | | 12/2005 | Bowditch |
| 7,017,299 | B1 | | 3/2006 | Speed |
| 7,232,987 | B2 | | 6/2007 | Webbeking |
| 7,271,887 | B2 | | 9/2007 | Bickel |
| 7,629,592 | B2 | | 12/2009 | Vermeulen |
| 7,654,038 | B2 | | 2/2010 | Simmons |
| 8,186,101 | B2 | | 5/2012 | Kurtz |
| 8,567,120 | B2 | | 10/2013 | Davis |
| 8,567,123 | B2 | | 10/2013 | Friesen |
| 8,935,879 | B1 | | 1/2015 | Falk |
| 9,060,472 | B2 | | 6/2015 | Li |
| 2002/0134010 | A1 | * | 9/2002 | Rohrborn, Jr. ......... A01G 13/04 47/29.1 |
| 2009/0194006 | A1 | | 8/2009 | Duncan |
| 2009/0293354 | A1 | * | 12/2009 | Goldberg ............. A01G 25/167 47/66.6 |
| 2011/0094155 | A1 | * | 4/2011 | Tompkins ............... A01G 9/02 47/66.6 |
| 2011/0265374 | A1 | * | 11/2011 | Tompkins, IV ........ A01G 13/10 47/31.1 |

OTHER PUBLICATIONS

Product description of cage planter manufactured by Fuzhou Premiere Crafts Co., Ltd. as Model No. D32468, JJ002 (Third department,10/F, Huamin Building, No. 165, Hudong Road, Fuzhou, Fujian Province, China 350003) retrieved from www.alibaba.com on Jan. 29, 2016.

Product description of cage planter manufactured by Putian Newpower Arts & Crafts Co., Ltd., Model No. JY09836 (405 Hongfeng Bldg. Jiaxin commercial Centre, Chengxiang , Putian City, Fujian Province. China 351100) retrieved from www.alibaba.com on Jan. 29, 2016.

Jason M. Gilsforf, Scott E. Hygnstrom, Kurt C. VerCauteren. Use of Frightening Devices in Wildlife Damage Management. Integrated Pest Management Reviews 1 (Mar. 7, 2002): 29-45.

Larry Clark. Review of Bird Repellents. Proceedings of the Eighteenth Vertebrate Pest Conference (1998). (R.O. Baker & A.C. Crabb, Eds.) Published at Univ. of Calif., Davis. 1998. Paper 6, pp. 330-337.

H. Kato-Noguchi, Y. Tanaka. Effects of Capsaicin on Plant Growth. Biologia Plantarum vol. 47 (Jul. 1, 2003): 157-159.

Gunia-Krzyzak A, Panczyk K, Waszkielewicz AM, Marona H. Cinnamamide Derivatives for Central and Peripheral Nervous System Disorders—A Review of Structure-Activity Relationships. ChemMedChem 10(Aug. 8, 2015):1302-1325.

Chen, Weiyan and Xu, Liangzhong. Growth-regulating Activity of Cinnamamide and Betaine Cinnamamide on Wheat. Advance Journal of Food Science and Technology 7(8, 2015): 584-588.

Gill, E. L., Watkins, R. W., Gurney, J. E, Bishop, J. D., Feare, C. J., Scanlon, C. B. and Cowan, D. P. Cinnamamide: A nonlethal chemical repellent for birds and mammals. Repellents in Wildlife Management Symposium: Proceedings of the Second DWRC Special Symposium. National Wildlife Research Centre. 4101 LaPorte Avenue, Fort Collins, CO 80521. Paper 5, pp. 43-51 Aug. 8, 1995.

T. Matsuzawa, Y. Aoki, N. Takeuchi, and Y. Murayama. A New Long Phosphorescent Phosphor with High Brightness, $SrAl_2O_4$: $Eu^{2+},Dy^{3+}$. J. Electrochem. Soc.143 (Aug. 5, 1996): 2670-2673.

Bingfu Lei, Bin Li, Xiaojun Wang, and Wenlian Li. Green emitting long lasting phosphorescence (LLP) properties of $Mg_2SnO_4:Mn^{2+}$ phosphor. Journal of Luminescence 118 (Jun. 2, 2006): 173-178.

* cited by examiner

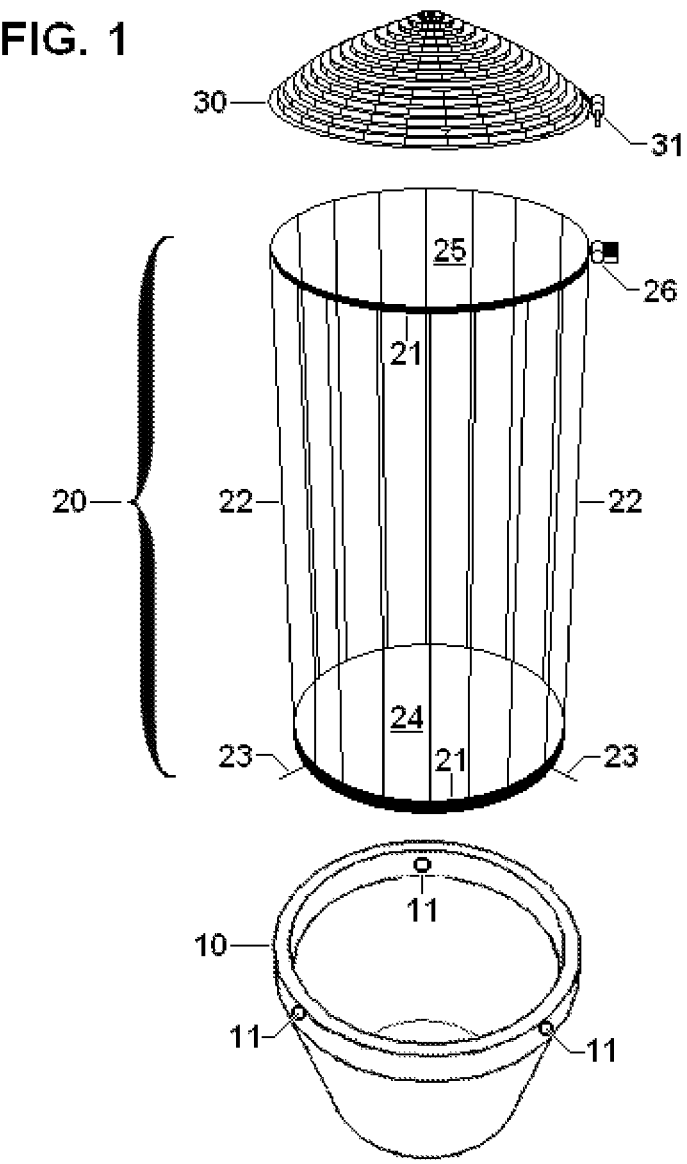

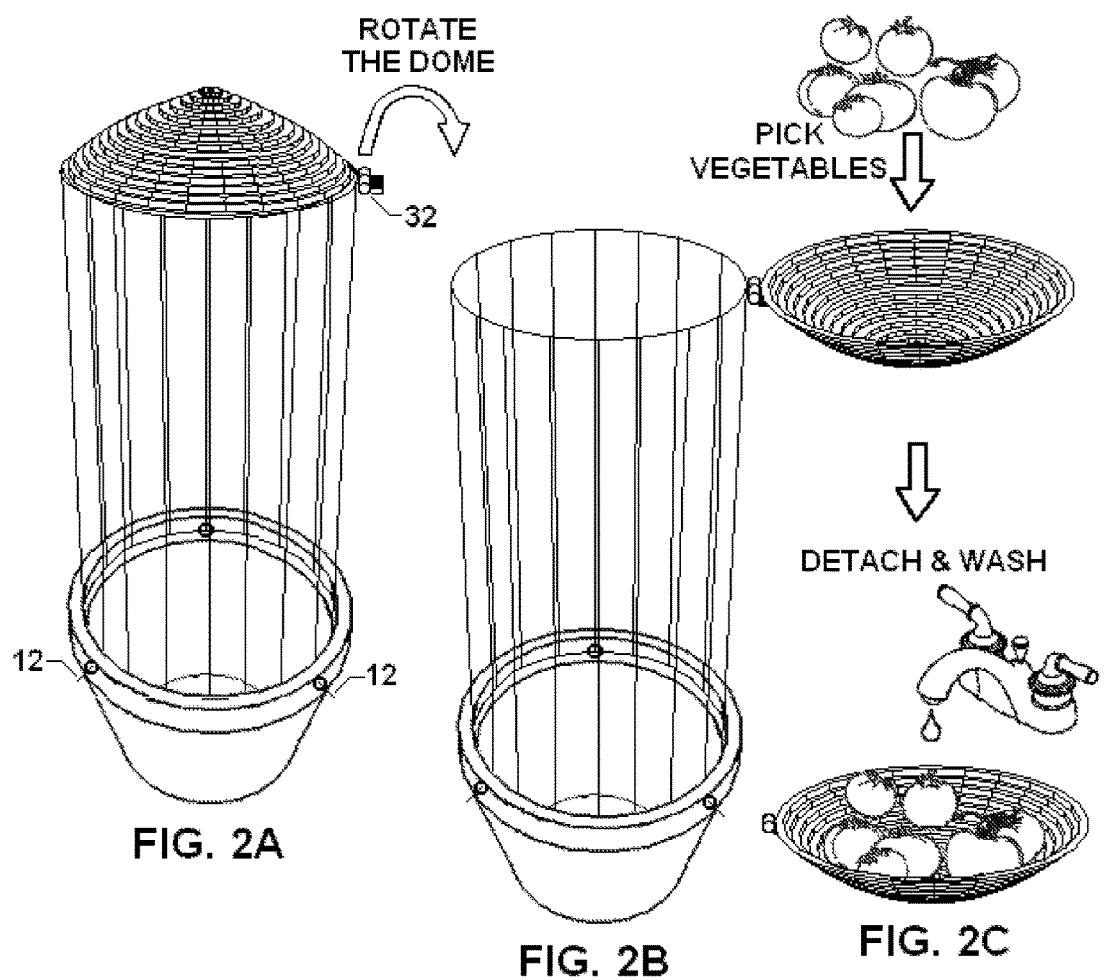

increase circumference of cage by reducing the overlap increase circumference of the dome's lip by moving collar along handle, to match circumferences of the dome and cage.

lift and rotate the upper hoop relative to the other hoop, then clamp in place.

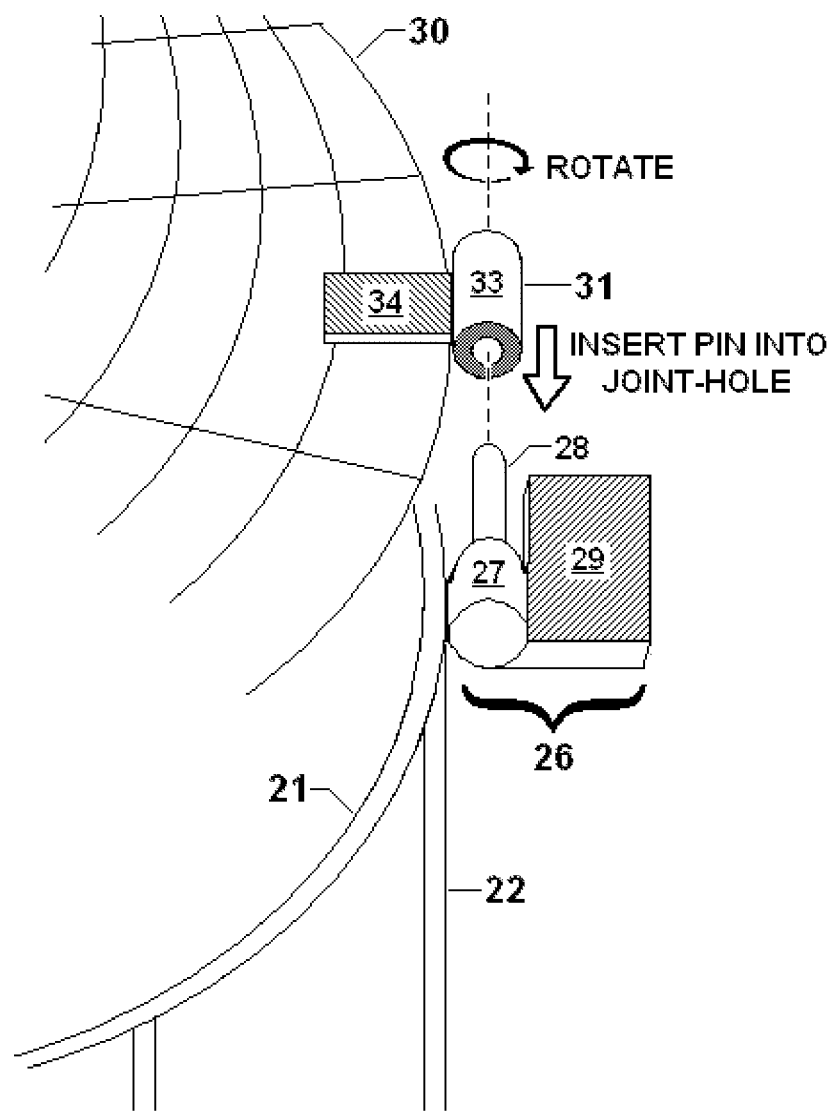

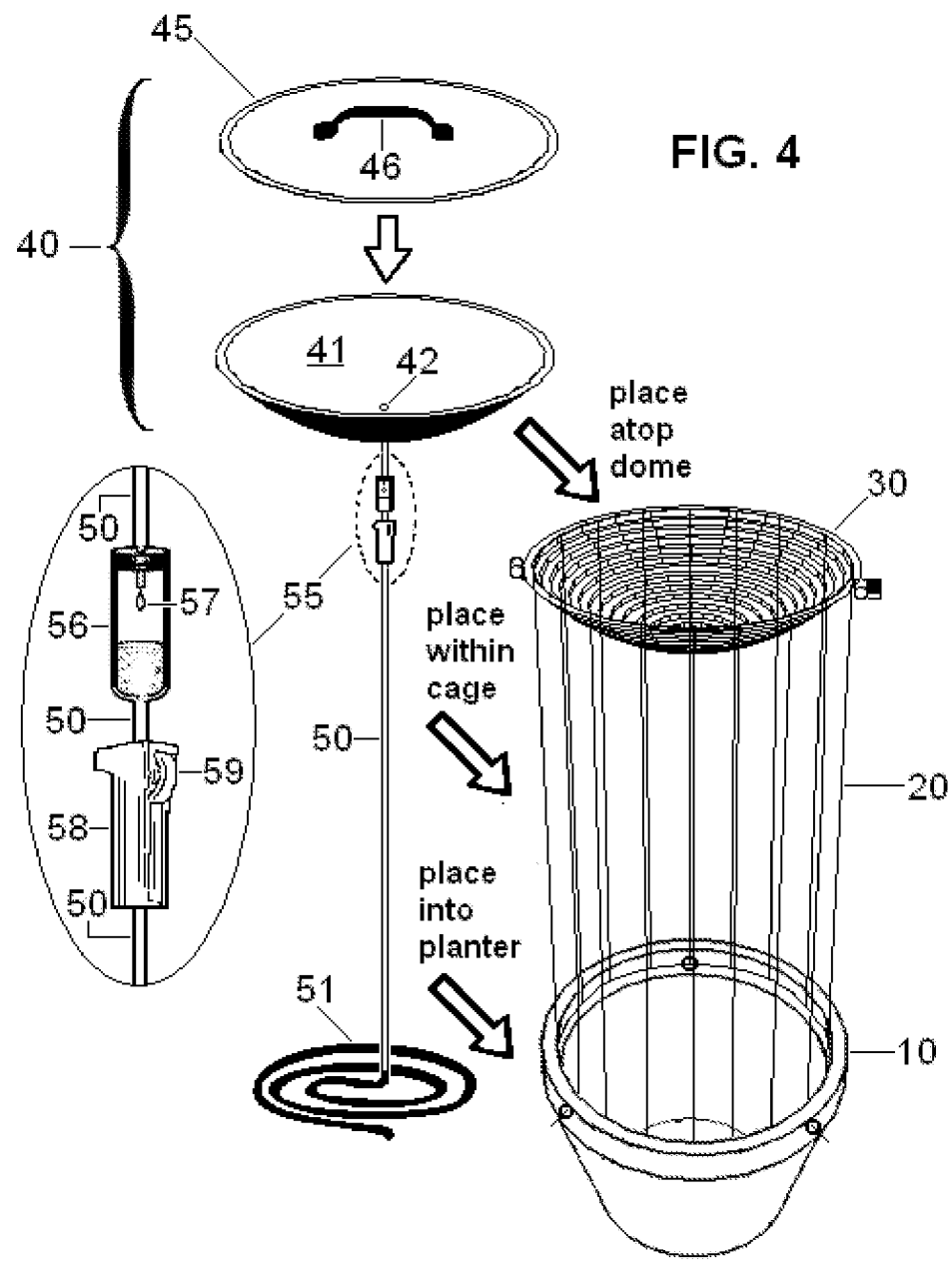

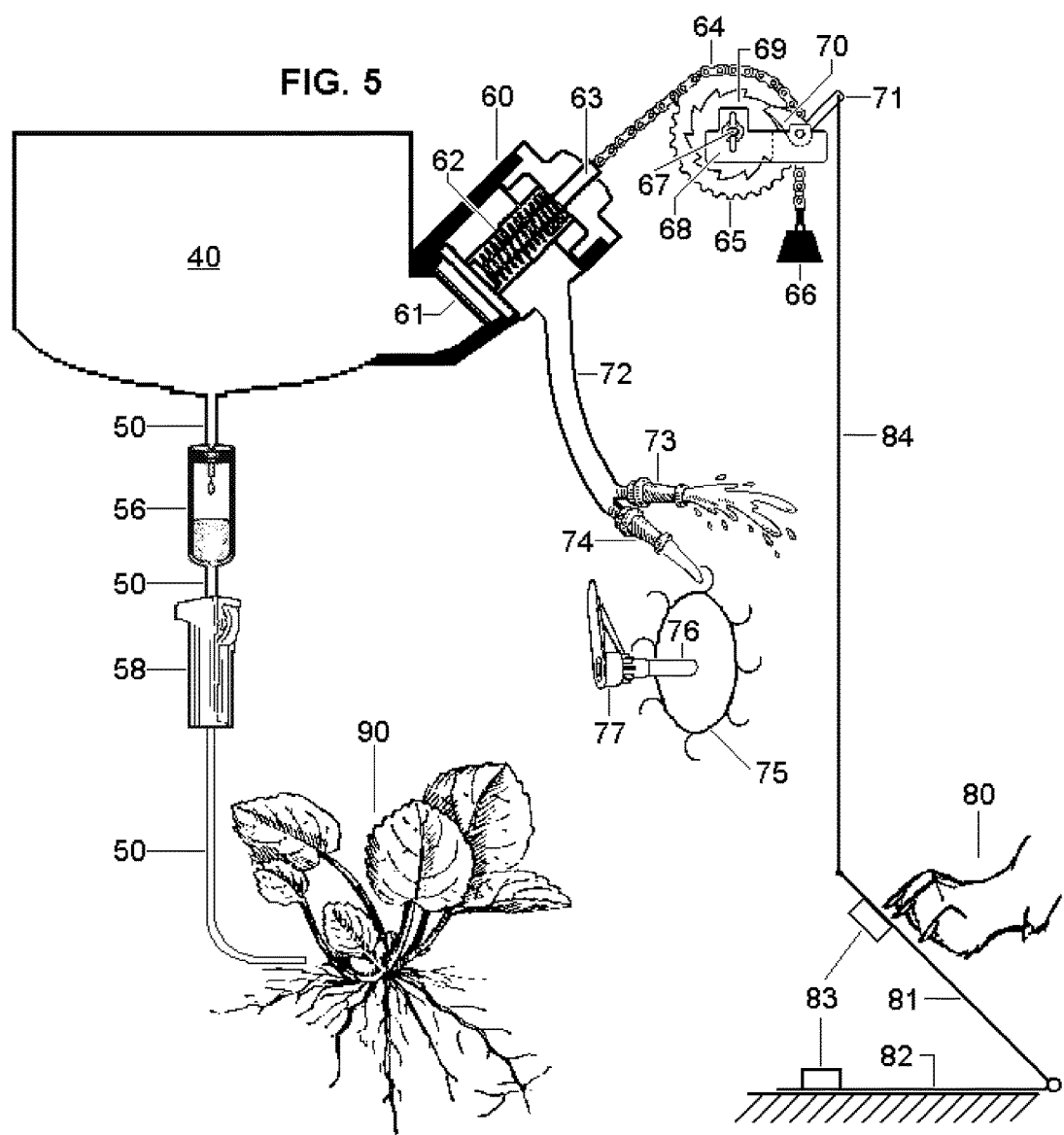

PLANT-PROTECTION CAGE WITH HARVESTING AND PRODUCE-RINSING DOME

BACKGROUND OF THE INVENTION

The present disclosure relates generally to the field of plant husbandry and to the preparation of food for consumption. It relates more specifically to covers that protect plants, to receptacles into which fruits and vegetables are harvested, to kitchen tools for the rinsing and/or cooking of produce, to the irrigation of cultivated plants, and to the deterrence of nuisance wildlife.

The invention that is disclosed here is intended to be used by home gardeners, who grow outdoor plants such as tomatoes, peppers, basil, rosemary, etc. Their gardening may be made difficult or unproductive due to the presence of pests, including nuisance animals that eat or damage the fruits, vegetables or leaves of plants in the garden. Examples of such animal pests include deer, gophers, mice, opossums, rabbits, raccoons, rats, skunks, squirrels, voles, birds, and snakes. Roaming dogs and cats may also be a problem for the gardener, despite the fact that they may also scare away wildlife that is causing a problem. The present invention is intended particularly to address problems associated with those types of animal pests, but it may also be useful in protecting garden plants against insect pests as well.

Many methods have been used to control nuisance animals in the garden. The animals may be trapped or otherwise eradicated. The animals may be repelled using scent repellents. Visual and/or auditory devices may also be employed to scare the animals away from the garden.

It is also possible to protect garden plants by erecting a structure that prevents the nuisance animals from approaching the plants. Fencing may be used, including electrified fences. However, fences may be expensive and may not be a barrier to animals that can burrow under, climb over, or fly over the fence.

A better approach is to more completely surround individual plants or plant beds with enclosures that protect the plants on many sides. A traditional method is to place a cloche onto the ground over the plant. The cloche resembles an inverted basket or a bell. It may contain apertures and may be made of different materials, such as bamboo, chicken-wire, plastic, aluminum, or glass. Depending on the size of the cloche apertures, the cloche may protect the plant not only from wildlife, but also from frost, wind-chill, and overexposure to the sun. However, a determined animal pest or heavy wind may be able to knock the cloche over to expose the plant, and it does not block animals or insects that burrow.

Cages have also been used to protect plants. Conventional tomato cages are used primarily to provide mechanical support to branches of the tomato plant, but when the plant is young and does not have branches that need such support, the cage will nevertheless provide some protection from wildlife, depending on the spacing of hoops and rods on the cage. However, other types of cages have been described that provide a more dedicated protection against wildlife. Examples include the cages shown in FIGS. 11 and 12 of U.S. Pat. No. 6,976,334, entitled Outdoor planter system, to BOWDITCH; U.S. Pat. No. 1,739,426, entitled Plant protector, to STRIPLING; U.S. Pat. No. 3,803,759, entitled Plant growth promoting and protecting device, to HEINECKE; U.S. Pat. No. 4,160,340, entitled Plant protection device, to LEVETT; U.S. Pat. No. 4,392,326, entitled Plant shelter, to BORIA; and U.S. Pat. No. 8,935,879, entitled Plant cage kit, to FALK.

The cages known in the art are ordinarily placed over a plant growing in the ground, as with a cloche. However, cages have also been described that attach to planters or flower pots. Examples are found in U.S. Pat. No. 6,061,953, entitled Potted plant protector device, to CHUBB et al.; U.S. Pat. No. 8,186,101, entitled Live goods planter cage and container, to KURTZ; and U.S. Pat. No. 8,567,120, entitled Modular plant support structure, to DAVIS et al. But none of them were designed with the deterrence of animal pests in mind.

Potted plants have also been placed within birdcages. See U.S. Pat. No. 2,914,022, entitled Bird cage, to HINTON, as well as examples of a "cage planter" manufactured by the Fuzhou Premiere Crafts Co., Ltd. as Model No. D32468, JJ002 (Third department, 10/F, Huamin Building, No. 165, Hudong Road, Fuzhou, Fujian Province, China 350003); or by the Putian Newpower Arts & Crafts Co., Ltd., as Model No. JY09836 (405 Hongfeng Bldg. Jiaxin Commercial Centre, Chengxiang, Putian City, Fujian Province, China 351100), which are listed and sold through Alibaba. However, the birdcage has a floor that is unnecessary unless the birdcage is being suspended, and the height of conventional birdcages limits the height of plants that can be grown within them.

A problem with existing plant-protection enclosure apparatus is that they are not constructed with plant harvesting in mind. Consider that many plants may require the gardener to harvest their fruits, vegetables, or leaves frequently. After the gardener has made a periodic inspection of the plant and has determined that the plant is ready for some harvesting, the gardener must get a receptacle in which to deposit the harvested produce, remove the enclosure apparatus from the plant, harvest the produce and deposit it into the receptacle, and replace the enclosure apparatus. The gardener will then go to the kitchen with the harvested produce, transfer the produce to a colander or similar tool for rinsing the produce, and if the gardener wants to enjoy the benefit of having freshly picked produce, he or she will then have to transfer the produce yet again to other cookware. The present invention is intended to save the gardener time and effort by eliminating some of the steps recited above, or by making it easier for the gardener to perform individual steps. The invention does not address a previously recognized problem or a previously recognized design need or a previously recognized market pressure in the arts of plant husbandry or food preparation. Accordingly, recognition of the problem that is solved by the disclosed invention is itself apparently novel.

BRIEF SUMMARY OF THE INVENTION

The plant husbandry and food preparation apparatus that is disclosed here is used most of the time to completely enclose a growing garden plant, so that the plant is protected on all sides from pests, e.g., nuisance animals that would otherwise eat or damage fruits, vegetables or leaves of the plant. The apparatus may comprise a planter in which the garden plant is grown, a cage that is attached to lip of the planter, and a dome that is seated atop the cage. The planter, cage, and dome are firmly attached to one another so that they can be lifted, transported, or hung as a single unit; but each unit may be easily detached from its neighbor in the assembly, if necessary. Accessories, such an irrigation system and components that make noise or a water shower to frighten an animal pest, may also be incorporated into the apparatus.

Occasionally, the seated dome of the apparatus is opened by the gardener, while the dome is still attached to the cage (e.g., by a hinge). The gardener is then able to reach into the cage encircling the plant, in order to harvest the plant's fruits, vegetables or leaves. Furthermore, the opened dome is configured to be suitable for use as a receptacle into which the harvested produce is deposited. And moreover, the dome is configured to be effortlessly detachable from the remainder of the apparatus, so that the harvested produce that had been placed within it may be conveniently transported and washed.

The term "effortlessly detachable" is defined here (and in the claims below) to mean that the dome may be detached from the remainder of the apparatus within less than about five seconds, without the use of any tools other than the gardener's hands. The dome may function as part of the plant enclosure, but the dome is also configured to function conveniently and suitably as a colander (or other type of receptacle) for the harvesting, conveyance and rinsing of harvested fruits, vegetables or leaves. In some embodiments, the dome may also serve as a strainer/steamer basket when it is suspended within a cooking pot, permitting the harvested produce to be conveniently cooked within minutes of their harvesting, with a minimum number of cooking tools. In another embodiment, the dome may support (or function as) a water-container that is used to irrigate the plant and supply a fertilizer solution, as well as serving as a water reservoir that is used to power a noise-maker and/or supply water for a shower that is intended to frighten the animal pest.

In another embodiment, the plant may be growing in the ground rather than in a planter, and the invention comprises a cage that may be inserted into (or placed on) the ground around the plant, along with the dome that is described above. However, the embodiment with the planter is preferred, because the planter protects the plant from pests that may make their way into the ground, and because the apparatus with its enclosed plant may be moved, e.g., to avoid damage that may be caused by cold or other inclement weather, or to relocate the plant to a location that has optimal sunlight or other suitable growing conditions. Furthermore, commercial growers can place soil and a small plant into the planter, and then attach the cage and dome onto the planter, so that the potted and protected plant can be made available to customers at a retail garden center as a pre-potted and assembled unit.

INCORPORATION BY REFERENCE

Hereby, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

BRIEF DESCRIPTION OF THE DRAWINGS

FIG. 1 illustrates components of the invention in a preferred embodiment, including a planter, plant cage, and dome, in which the plant cage and dome have mated half-hinges that allow the cage and dome to be effortlessly attached to one another (and detached from one another).

FIG. 2 illustrates the assembly and usage of the invention that was shown in FIG. 1.

FIG. 2A shows the invention's planter, cage, and dome assembled for use, prior to the planting of a garden plant in the planter.

FIG. 2B illustrates opening of the dome to allow the harvesting of produce from garden plants that are growing within the cage, as well as placement of that produce into the dome, with the dome being used as a produce-receptacle.

FIG. 2C shows the dome of the invention detached from the cage, illustrating use of the dome to rinse the produce.

FIG. 2E shows the apparatus adjusted to have a larger circumference than the circumference shown in FIG. 2D, which is accomplished by unrolling an overlap in the cage, and by adjusting an umbrella-like mechanism of the dome to match the cage's circumference.

In FIG. 2F, meshes of the two structures are aligned in-register with one another, such that the apertures of the dome have their maximum sizes. In FIG. 2G, the apertures of the dome are adjusted to have smaller sizes by misaligning meshes of the two structures, such that meshes of the two nested structures are out-of-register relative to one another.

FIG. 3 illustrates one mechanism that allows the cage and dome shown in FIGS. 1 and 2 to be effortlessly attached to (or detached from) one another.

FIG. 4 illustrates irrigation of a planter according to one embodiment of the invention.

FIG. 5 illustrates an embodiment of the invention in which an animal pest is deterred using a stream of water (or solution containing chemical irritants) and a noisemaker.

DETAILED DESCRIPTION OF THE PREFERRED EMBODIMENTS

Figure 2D:
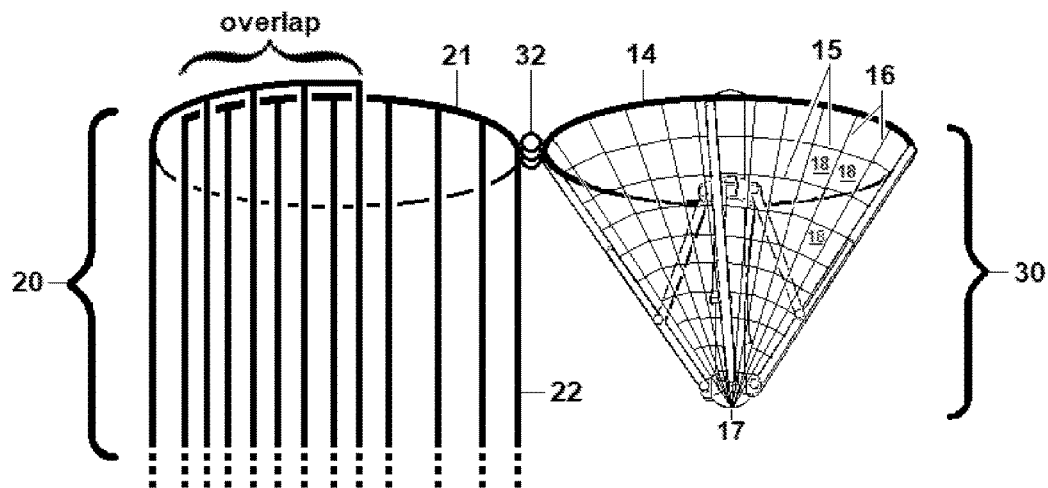
FIGS. 2D and 2E show how the circumferences of the cage and dome can be adjusted by the gardener, in order to accommodate change in the size or shape of an enclosed plant.

FIG. 1 illustrates components of the invention in a preferred embodiment, including a planter 10, plant cage 20, and dome 30, in which the plant cage 20 and dome 30 have mated half-hinges that allow the cage and dome to be effortlessly attached to one another (and detached from one another). The half-hinges for the cage and dome are labeled in FIG. 1 as 26 and 31, respectively. In the embodiment shown here, the cage 20 comprises a pair of hoops 21 that are connected to one another by rods or bars 22. The lower hoop defines a lower opening 24, and the upper hoop defines an upper opening 25. The lower opening 24 of the cage is configured to be attached circumferentially to the upper portion of the planter 10. In FIG. 1, the attachment is shown to be accomplishable by inserting short rods 23 at the base of the cage 20 into holes 11 near the top of the planter 10. Such holes 11 are also found in planters that are intended to be hung via supporting wires and are in addition to a drainage hole that is ordinarily found at the bottom of planters. Alternatively, the cage may contain clips below its lower hoop, and those clips may be connected directly to the lip of the upper portion of the planter to secure the planter and cage to one another. Alternatively, the cage may contain spikes that hook into a groove near the bottom of the inner portion of the planter. For these mechanisms of attaching the cage 20 to the planter 10, and any similar attachment mechanisms that may be used, effortless attachability/detachability of the cage to the planter is an important and distinctive characteristic of the invention. This serves to provide easy access to the protected produce for purposes of harvesting and plant/soil care, in addition to access through the dome 30 that is described below.

As indicated in FIG. 1, the cage contains apertures between the rods or bars 22, the size of which are selected to block entry into the cage by nuisance animals, but also to allow for an adequate amount of ventilation and sunlight that the plant may need. The cage may be made of plastic, bamboo or wood, or other materials, in addition to (or in place of), metals such as stainless steel. In some embodiments the cage may be more complicated than the simple hoops and rods arrangement that is shown in FIG. 1. The rods or bars may have variable spacing, or non-rod wiring may be part of the cage (e.g., chicken-wire, screening, or netting). The cage may have a variable or adjustable height and/or circumference and/or shape. Thus, the invention contemplates variation in height, circumference, or shape throughout the growing season and variation at a given time, e.g., letting the gardener select a barrel-shaped or conical cage, in addition to a cylindrical cage. The mechanism that allows for such variability may involve a concertina-like structure, a flexible helical spring, modular cage subunits, overlapping wire sheets that allow the sheets to be secured at different amounts of overlap, nested individual cages that may be rotated and/or displaced relative to one another, and the like.

The cage may comprise barbs or other items that repel animals. Accessory cage components may slip around (or attach onto) the cage shown in FIG. 1, such as a cylindrical screen that provides a barrier to flying insects, or an insulation sleeve or blanket that prevents cold-damage during frosty nights. Additional accessory components may be introduced within the cage to aid growth of the plant, such as rods that are inserted into the ground about the plant in order to provide mechanical support for heavy branches and fruit.

FIG. 2 illustrates the assembly and use of the invention that was shown in FIG. 1. FIG. 2A shows the invention's planter, cage, and dome assembled for use, prior to the planting of a garden plant in the planter. FIG. 2B illustrates opening of the dome to allow the harvesting of produce from garden plants that are growing within the cage, as well as placement of that produce into the dome, with the dome being used as a produce-receptacle. FIG. 2C shows the dome of the invention detached from the cage, illustrating use of the dome to rinse the produce. In some embodiments, the dome may also serve as a strainer/steamer basket when it is suspended within a cooking pot, permitting the harvested produce to be conveniently cooked within minutes of their harvesting. With regard to the opening of the dome and its use to collect harvested produce, such an arrangement appears to be novel, because the prior art has heretofore only disclosed a tray for putting things next to a planter, but that tray is not attached to a cage, and it does not have the shape of a bowl (Abandoned patent application No. U.S. Ser. No. 12/384,647 having publication No. 20090194006, entitled Plant pot tray, to DUNCAN).

The dome may be made of plastic, bamboo or wood, or other materials, in addition to (or in place of) metal such as stainless steel. However, the dome should be made of a non-toxic material and material that is not susceptible to corrosion. The size of apertures within the dome should be selected according to the size and shape of the fruits, vegetables, or leaves that are to be harvested. Thus, one would not use a dome having apertures that allow the harvested produce to fall through the apertures.

A dome with adjustable apertures may also be used in order to accommodate the harvesting of produce having different sizes. The adjustable dome may be constructed by placing two or more nested domes like the one shown as 30 in FIG. 1 into one another, but in which the individual domes have a relatively wide spacing for their constituent horizontal wires that run concentrically and for their constituent vertical wires that run from bottom to apex. When the individual nested domes are rotated relative to one another and clamped into place, the collective spacing between the vertical wires of the nested domes allows the gardener to select a range of aperture sizes, depending on the number of nested individual domes and the spacing of constituent wires within the individual domes. Only the outermost nested dome need be attached to the half-hinge 31 that is shown in FIG. 1. Furthermore, this arrangement also allows the aperture size to be different depending on whether the plant is being protected from nuisance animals (as in FIG. 2A), versus the dome being used as a harvested-produce receptacle (FIG. 2B and FIG. 2C). It may even allow the apertures to become completely closed, such that the dome becomes watertight, if that is a desired feature. The use of two or more rotatable nested cages (each of which is similar to the one shown as 20 in FIG. 1) would also allow the apertures of the cage to be have variable sizes. The dome may also be made to have an adjustable base (bowl lip) diameter by giving it an umbrella-like structure, preferably with a short handle, that can be opened (or closed) to a preferred circumference that can be locked in place.

Figure 2E:
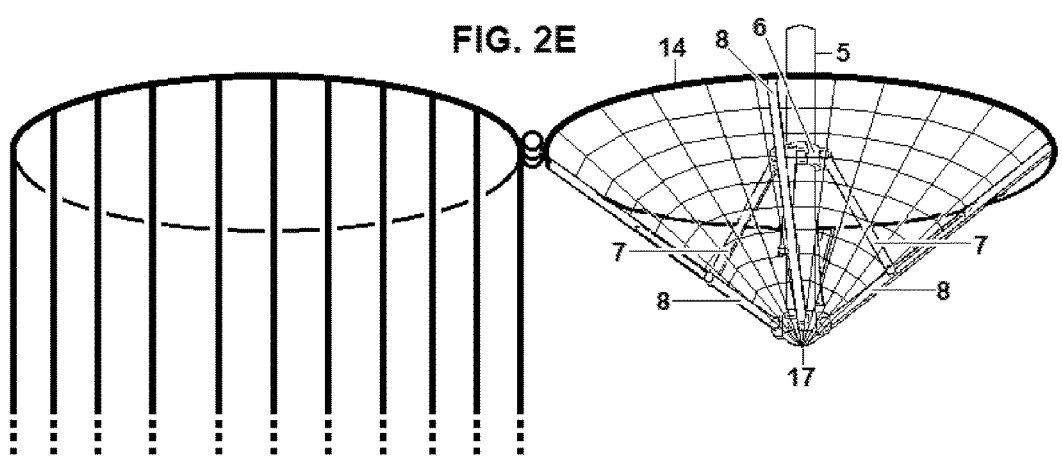

FIGS. 2D through 2G show embodiments of the apparatus that illustrate the above-mentioned variability and/or adjustability of the apparatus's aperture size(s), overall circumference, or other such dimensions or shapes of the apparatus. FIGS. 2D and 2E show how the circumference of the cage and dome can be adjusted by the gardener, in order to accommodate change in the size or shape of an enclosed plant or its produce, e.g., throughout the growing season. For example, a tomato plant may initially be a mere seedling, then grow to be tall and bush-like. FIG. 2E shows the apparatus adjusted to have a larger circumference than the circumference shown in FIG. 2D. This is accomplished by unrolling an overlap in the cage, and by adjusting an umbrella-like mechanism of the dome.

In FIG. 2D, the plant cage 20 comprises a top hoop 21 that is connected to a bottom hoop (not shown) by rods or bars 22. A section of the cage is shown to overlap itself. In that overlapped section, the spacing of adjacent rods or bars 22 is generally different than the spacing of adjacent rods or bars in the non-overlapped section, depending on the extent to which rods or bars 22 in the overlap are in-register with one another. When the gardener reduces the amount of overlap by unrolling the cage (as shown in FIG. 2E), the circumference of the cage 20 (and its top hoop 21) increases, up to the additional length corresponding to the overlap seen in FIG. 2D.

The cage 20 is connected to its dome 30 by a hinge 32. As described below and exemplified in FIG. 3, the structure of the hinge 32 is such that the cage 20 and dome 30 can be effortlessly detached from one another, so that the gardener can use the dome as a detachable receptacle and colander for harvested produce (see FIGS. 2B and 2C). But most of the time, the dome is used to completely cover the cage in order to protect the enclosed plant from wildlife (see FIG. 2A), during which time the circumference of the dome should be at least equal to the circumference of the cage. FIGS. 2D and 2E illustrate an umbrella-like mechanism whereby the circumference of the dome's lip 14 can be increased to match the circumference of the cage 20 (and its top hoop 21), following an increase in the circumference in the cage 20.

The dome's lip 14 is made from material that permits the dome's circumference to readily increase or decrease without breaking, using non-toxic material that is known in the art. For example, the dome's lip 14 may comprise an elastic material (e.g. bungee cord), a circular spring, a circular bellows (concertina-like structure), sections of sliding tubes-within-tubes, overlapping wires (like the top hoop 21 shown in FIG. 2D but without attached rods or bars 22), or the like.

Whatever circumference the gardener selects for the dome's lip 14, the lip is held at that circumference by the ribs 8 of an umbrella-like mechanism. For clarity of illustration, only a few such ribs 8 are shown in FIGS. 2D and 2E, but in preferred embodiments, there will be many more ribs, as exemplified by the numerous ribs of an ordinary umbrella. Also as in an ordinary umbrella, each of the ribs is held in place by attachment to one end of a corresponding stretcher piece 7. The other end of each stretcher piece 7 is connected to a collar 6 that is also known as the stretcher hub. The collar slips over and slides along a shaft that can be held at its free end, so the shaft is called the handle 5. The ribs 8 are hinged at the non-free end of the handle, forming the cap 17 of the umbrella-like dome mechanism.

As the gardener slides the collar 6 up and down the handle 5, the circumference of the dome's lip 14 changes, as illustrated by the increased circumference in FIG. 2E relative to that in FIG. 2D. When the dome is being used to protect the plant from wildlife, the dome and cage will generally be selected to have the same circumference, and the collar 6 is locked in the corresponding position (locking mechanism not shown, but can be any locking mechanism known in the art, such as a simple thumb-screw). Once the circumference of the dome's lip has been adjusted to match the circumference of the cage, the dome is then flipped over on top of the cage, as shown in FIG. 2A, in order to protect the enclosed plant from wildlife.

But when the dome is being used to harvest produce, as in FIG. 2B, there is no need for the dome to have the same circumference as the cage, and the dome's circumference may instead be selected to exploit features of the umbrella-like mechanism that are inherent to its use as a receptacle. Those inherent features are (1) the variability and (2) the adjustability of the distance between adjacent ribs 8 that connect the dome's lip 14 to the dome's cap 17. FIGS. 2D and 2E show only a few ribs (in order to keep the figures uncluttered and comprehensible), and the inherent features are more readily comprehended by considering a dome having many more ribs (say, between 8 and 32 ribs) than the few that are shown in the figures. At a fixed collar location (and fixed circumference of the dome's lip 14), the distance between adjacent ribs 8 is greatest near the dome's lip 14 and is smallest near the cap 17. So, in that sense, the distance between adjacent ribs 8 is variable. Now consider what happens when the circumference of the dome's lip 14 is changed by sliding the collar 6 along the shaft of the handle 5. At any given distance along a rib 8 (say, the rib's midpoint between the dome's lip 14 and cap 17), the distance between adjacent ribs 8 increases as the collar 6 is moved along the shaft towards the cap 17, and that distance decreases as the collar is moved away from the cap. So, in that sense, the distance between adjacent ribs 8 is also adjustable.

Consequently, in regards to use of the dome as a receptacle for harvested produce, inherent features of the above-described umbrella-like mechanism are that: (1) small produce deposited into the dome would more likely not fall between the ribs if deposited near the cap 17, rather than near the dome's lip 14; and (2) moving the collar 6 along the handle 5 away from the cap 17 (i.e., decreasing the dome lip's circumference) would make it less likely that deposited small produce would fall through the ribs at any particular position along the rib (e.g., its midpoint).

Increasing the number of ribs to more than the few that are shown for in FIGS. 2D and 2E would also make it less likely that deposited small produce would fall through the ribs. However, using a large number of ribs would also run counter to the objectives of providing suitable sunlight and ventilation, because the ribs would be present whether the dome was being used to harvest produce or to protect the plant from wildlife [suitable sunlight measured as in Patents U.S. Pat. No. 7,271,887, entitled "Sunlight measuring device" to BICKEL and RICHARDSON; U.S. Pat. No. 7,629,592B2 entitled "Apparatuses, components and methodologies for determining suitability conditions for plant growth" to VERMEULEN and VANRENTERGHEM; U.S. Pat. No. 7,232,987B2 entitled "Instrument and method to measure available light energy for photosynthesis" to WEBBEKING et al.]. Therefore, for a dome that is constructed having its number of ribs within the number-range needed to provide adequate sunlight and ventilation for the plants that are being gardened, the following is an inherent feature of use of the dome shown in FIGS. 2D and 2E—during harvesting, the gardener will slide the collar as far away from the cap 17 as necessary, considering the size and shape of the produce that is being harvested and considering of the total amount of produce that is being harvested during that session of harvesting. For example, if blueberries are being harvested, the position of the collar would be one for which the last berry that is harvested during that session does not fall between the ribs, even though a berry might have fallen between the ribs near the dome's lip had there been many more berries to pick.

Whereas the ribs of an ordinary umbrella are attached to a waterproof fabric that is intended repel rain, the above-disclosed umbrella-like mechanism does not include such fabric, because that would defeat the objectives of providing adequate ventilation and sunlight and rainfall-watering. In place of fabric, the invention contemplates an optional open-meshed structure. That structure is shown in FIGS. 2D and 2E as a criss-cross pattern (mesh) that consists of vertical criss-cross segments 16 and horizontal criss-cross rings 15. The meshed structure is connected to the dome's lip 14 and cap 17, and in some embodiments it is also attached to one or more ribs 8.

Considering that ribs 8 alone may serve the function of retaining produce that is deposited into the dome, the open-meshed structure is optional. Thus, in some embodiments, the apparatus may have ribs 8 occupying locations shown in FIGS. 2D and 2E to have the vertical criss-cross segments 16, and the criss-cross rings 15 may also be omitted. In some embodiments, the vertical criss-cross segments 16 may be present, but without the criss-cross rings 15. And in some embodiments, only ribs 8 and criss-cross rings 15 are present. If the rings are present (as illustrated here), the resulting apertures of the dome are trapezoidal, and if the rings were absent, the resulting apertures would generally resemble a tapered strip or wedge, like a narrow piece of pie.

For those embodiments that have the open-meshed structure, the criss-cross rings 15 should be made of non-toxic material that allows them to increase and decrease in circumference as the collar is moved along the handle (as is the case with the dome's lip). In contrast, the vertical criss-cross segments 16 will generally maintain an approximately fixed length when the collar is moved, in which case they need not be stretchable, except possibly in the vicinity of the cap 17 if the vertical criss-cross segments 16 are attached but not hinged at the cap.

The sizes of apertures 18 in embodiments containing the open-meshed structure are determined by the number and spacing of the vertical criss-cross segments 16 and the criss-cross rings 15, as well as the location of the aperture along a line between the dome's lip 14 and cap 17. Inherent features of such apertures are similar to the inherent features for embodiments without the open-meshed structure—small produce deposited into the dome would more likely to not fall through the apertures if deposited near the cap 17, rather than the dome's lip 14; and moving the collar 6 along the handle 5 away from the cap 17 (i.e., decreasing the dome lip's circumference) would make it less likely that deposited small produce would fall through the apertures, because that movement of the collar will decrease aperture size.

Figure 2F:
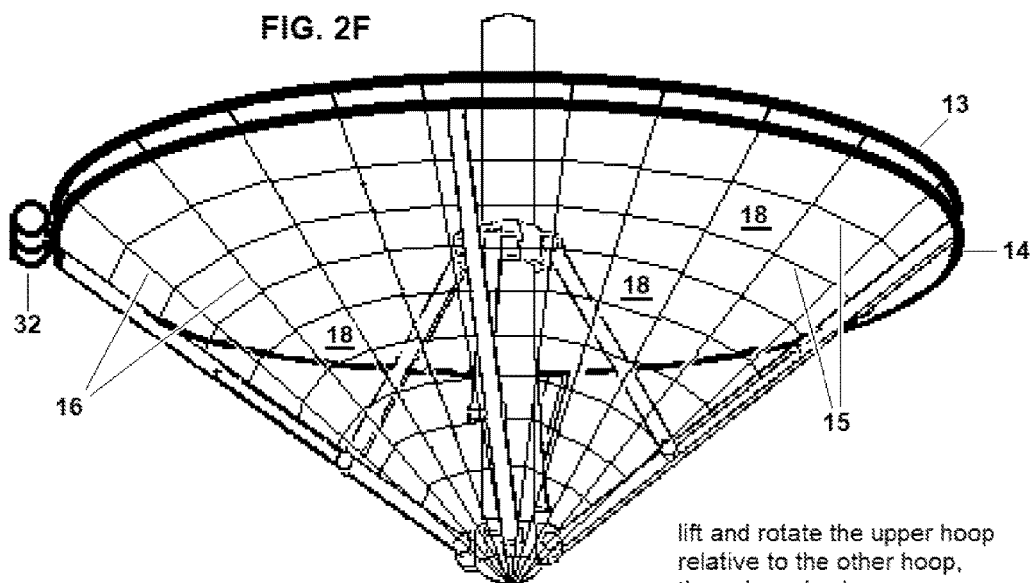
FIGS. 2F and 2G show how the size of apertures of the dome shown in FIGS. 2D and 2E can be further adjusted, by nesting two mesh-containing structures within one another.
Figure 2G:
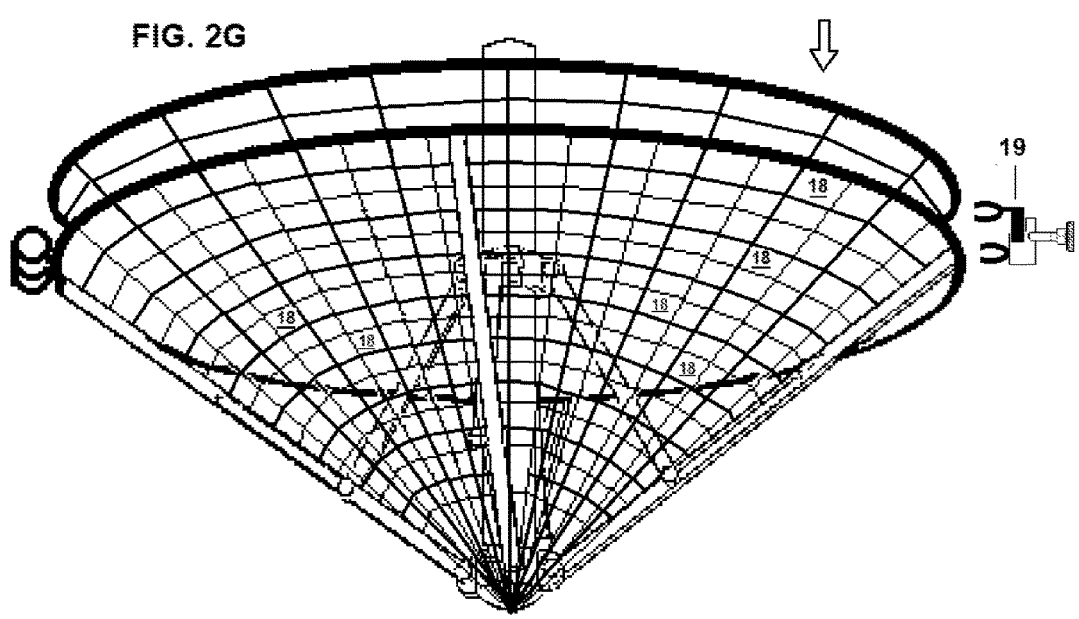

In addition to moving the collar 6 up and down the handle 5, the invention contemplates other mechanisms for adjusting aperture size in the dome. FIGS. 2F and 2G illustrates one such mechanism, which involves nesting two open-meshed structures into one another. The lower part of the dome in FIG. 2F is identical to the dome in FIG. 2E, and it comprises the dome's lip 14, as well as vertical criss-cross segments 16, and the criss-cross rings 15 that form its open mesh. In addition, a second hoop 13 is placed near and parallel to the dome's lip. The second hoop 13 has a slightly smaller circumference than the dome's lip 14, in order that the dome's lip will still cover the cage when the dome is rotated about the hinge 32, as shown in FIG. 2A. A second set of vertical criss-cross segments connects the second hoop 13 to the cap 17. The second set of vertical criss-cross segments will generally maintain an approximately fixed length when the collar is moved and potentially may need to be elastic only near where the ribs meet the stretchers, where they are attached to the cap, and in the vicinity of the second hoop (which may be lifted a small distance as shown in FIG. 2G). As explained in connection with FIGS. 2D and 2E, the use of a second set of elastic criss-cross rings is optional. If the rings are present (as illustrated here), the resulting apertures are trapezoidal, and if the rings were absent, the resulting apertures would resemble a tapered strip or wedge, like a narrow piece of pie.

When the open mesh that is attached to the dome's lip 14 is in register with the open mesh that is attached to the second hoop 13, as shown in FIG. 2F, the apertures 18 of the dome have the same size and shape as the dome shown in FIG. 2E. But when the second hoop 13 is lifted and rotated by a small amount relative to the dome's lip, as shown in FIG. 2G, the two open mesh structures are no longer in register, and they jointly define a new set of smaller apertures 18. Whether the two open mesh structures are in register (FIG. 2F) or not (FIG. 2G), the dome's lip 14 and the second hoop 13 can be locked in position using one or more clamps 19. If one (or more) additional hoop and its associated open mesh structure were nested atop the two shown in FIGS. 2F and 2G, then the dome's aperture sizes would have even greater adjustability, the selected sizes of which would depend on the extent to which the gardener placed the several open mesh structures in register with one another.

FIG. 3 illustrates one mechanism that allows the cage and dome shown in FIGS. 1 and 2 to be effortlessly attached to (or detached from) one another. An edge of the cage has a half-hinge 26 comprising a pin 28 that emanates from the body 27, along which the half-hinge attaches to the cage (e.g., by welding). The pin 28 is configured to be inserted into (or removed from) a joint-hole that is within the body of a cylinder 33 in a second half-hinge 31 that is attached to the edge of the dome (e.g., by welding the body 33 or an attached leaf 34 to the dome). A stop-leaf 29 is used to limit rotation of the dome about the pin 28. This may involve the touching of the stop-leaf 29 by another leaf 34 that is attached to the dome, or depending on the structure of the dome itself, the additional leaf 34 might not be necessary. In either case, the use of a stop allows the dome to be characterized as having a flip-top structure.

Alternatively, one might create the detachable hinge by inserting a J-shaped half-hinge on the dome into a D shaped half-hinge on the cage (with the hook of the J hooked around the straight part of the D). As another alternative, the dome may have an expandable nearly-closed C-shaped spring-clip that clips onto (and is effortlessly detachable from) the upper hoop 21 of the cage shown in FIG. 1. In such alternate mechanisms, the range of rotation of the dome may also be limited by a leaf-stop.

The cage and dome may also be effortlessly detachable from one another using a mechanism that does not involve a hinge. For example, the cage 20 in FIG. 1 may have preferably three neighboring rods 22 that extend upwards a short distance beyond the upper hoop 21, and the dome 30 may have holes that correspond to the positions of those rod extensions. When those holes of the dome are dropped into those rod extensions of the cage, the dome and cage will remain in the proper position relative to one another as in FIG. 2A, which is a mechanism analogous to the insertion of the rods 23 into the planter holes 11 in FIG. 1. Detaching of the dome from the cage would then be accomplished simply by lifting the dome above the cage's rod extensions. If the dome is then inverted, and the dome also contains holes in the inverted position that correspond to the position of the cage's rod extensions, then the inverted dome may be attached to the cage by dropping the holes of the inverted dome onto those rod extensions. With this mechanism, the position of the dome relative to the cage may be configured to be similar to what is shown in FIG. 2B, except that an arc of the outer perimeter of the dome slightly overlaps an arc of the outer perimeter of the cage, as defined by the location of the preferably three cage-rod extensions. This type of mechanism may be preferred if the dome has the umbrella-like structure that is mentioned above. Also, this type of mechanism may be used when the inverted dome is placed atop the cage as in FIG. 4.

When the dome is mounted atop the cage as illustrated in FIG. 2A, additional fasteners such as clips, snaps, or velcro strips may be used to secure the dome 30 to the cage 20, so as to add additional integrity to the apparatus. If the fasteners also allow for the attachment of locks, security against theft will also be provided. Furthermore, in a preferred embodiment, the planter 10, cage 20, and dome 30 are firmly secured to one another with such fasteners so that the entire assembly may be lifted and transported, by holding any of its constituent parts. Handles may be attached to the planter 10, cage 20, and dome 30 to facilitate that lifting. The handle that is attached to the dome 30 would also allow the entire unit to be suspended from a hook, in the event that the gardener wanted to hang the assembled structure out of the reach of nuisance animals. The handle may also be attached to a lid that is itself attached directly or indirectly to the dome, e.g, the handle 46 shown in FIG. 4. For such suspended usage, one would not want to have to lower the assembled structure in order to gain access through the dome 30, so the invention envisages the presence of a small hinged door in the cage 20 to allow the gardener to reach within the structure near the planter 10, without lowering the assembled unit. However, such suspension of the assembled structure would have the disadvantage that it may promote drying of the contents of the planter 10, through its drainage hole.

Accessories for the apparatus shown in FIGS. 1 and 2 include thermal cloaks to prevent frost damage, tubing for watering of the plant, lighting devices to assist growth of the plant overnight or during overcast days or indoors, and the like. The thermal cloak may be as simple as a bubble-wrap or blanket, or as complicated as double-walled greenhouse windowing that is used in conjunction with a temperature-regulated heater [e.g., U.S. Pat. No. 5,412,905, entitled Tomato green house, to ALLISON; U.S. Pat. No. 6,640,491, entitled Gardening Device, to FOX; U.S. Pat. No. 6,012,249, entitled Insulated plant cover, to CHENEY]. Many types of irrigation systems have been proposed to water garden plants automatically. Such systems are useful, for example, when a gardener will be out of town and needs to make sure that the plants will not dry out. An automatic but passive irrigation system may be incorporated into the structure of the planter 10, as disclosed in U.S. Pat. No. 6,418,663, entitled Potted plant watering apparatus, to SMITH; U.S. Pat. No. 6,185,866, entitled Plant waterer apparatus, to ENFARADI; U.S. Pat. No. 8,567,123, entitled Water wick pot, to FRIESEN; and U.S. Pat. No. 9,060,472, entitled Plant container, to LI. However, FIG. 4 shows how unique features of the presently described system can be exploited to perform irrigation, with a maximum water pressure that is significantly greater than produced by the above-mentioned systems. In that figure, the configuration of the planter 10 and cage 20 are unchanged from what is shown in FIG. 2, but the dome 30 is inverted and placed atop the cage 20. A water-container 40 is then placed within the dome. In FIG. 4, the water-container 40 consists of a bowl 41 and a lid 45 that can cover the bowl 41. The lid 45 may be removed using its handle 46 to allow rainwater to enter the bowl, or water may be added from a watering can or water hose. Instead of pure water, the gardener may also place into the water-container 40 solutions of garden fertilizers, compost tea, plant micro-nutrients and electrolytes, insect and fungus management solutions, and the like. Such additives should preferably correspond to the species of plant that is being gardened, the proper selection of which can be ascertained from gardening publications and horticultural societies, as well as horticulturists in a garden center or nursery, agricultural extension office, or horticultural department in a land-grant college.

Unlike most other passive automatic irrigation systems, the water in the bowl 41 is significantly elevated relative to the planter 10. The water passes through a hole 42 at the bottom of the bowl 41, and then passes through a tube 50 until it reaches plants in the planter 10. Thus, as indicated with the arrows in FIG. 4, the tube 50 will ordinarily be situated within the cage 20. Because the water pressure increases as the height of the tube 50 increases, the maximum flow rate of water through the tube is correspondingly fast. However, once the soil in the planter 10 is moist, only a steady drip from the water reservoir in the container 40 may be necessary to keep it moist. The objective of the drip watering is to compensate for moisture in the planter that is lost through evaporation, drainage through the drainage hole of the planter, and consumption by the plants. For a fixed tube height, the drip rate may be adjusted using the flow rate adjustment apparatus 55 that is shown in FIG. 4. That apparatus comprises a drip chamber 56, a roller clamp 58, and tubing 50 that connects the chamber and clamp to the water reservoir above them and to the tubing below that goes to the planter 10. The chamber 56 and clamp 58 are available from medical supply houses, because they are otherwise intended to be used in the intravenous drip line of a patient.

Water entering the drip chamber 56 appears as a series of clearly visible drips 57. Drip chambers are standardized as either 20 drops/mL or 60 drops/mL chambers, but the gardener should nevertheless calibrate the chamber, by counting the number of drops needed to produce a much larger measured volume. The number of drops per minute may be adjusted with the roller clamp 58, by rolling the thumbwheel 59 so as to constrict the tubing 50 by the desired amount. Note that if the lid 45 covers the bowl 41 so tightly that the chamber within the covered bowl is effectively airtight, apart from the hole 42 at the bottom of the bowl 41, then the dripping of fluid from the bowl 41 through the tubing 50 will create a partial vacuum within that chamber. That partial vacuum would decrease the hydrostatic pressure of the column of water within the tubing 50, thereby slowing the dripping of fluid. Such a decrease in pressure does not occur in flexible medical drip bags because, unlike the lid 45 and bowl 41, the drip bags are not rigid and will collapse as fluid drips from the bags. But when a rigid drip bottle is used to provide an intravenous infusion, a vent hole at the top of a drip chamber like the one shown as 56 is used to allow air to enter the bottle to prevent formation of a vacuum. Therefore, if the chamber of the covered bowl is airtight, such a drip chamber vent should be used in conjunction with the drip chamber 56, or the lid 45 should contain a small air hole as a vent. A secondary mechanism for controlling the drip rate would be to also include an adjustable opening/closing hole area within the lid 45, the design for which could be similar to the adjustable vent mechanism in the lid of a barbeque grill.

The water drops may emerge directly from the tubing 50 into the planter, or the tubing may be directed at the end to different parts of the planter 10 using Y-shaped tubing connectors or tubing that penetrates the soil with one or several branching stems. The tubing in the soil will have holes in it so that water may be absorbed by the soil as needed. Thus, once the soil is saturated, there would be less diffusion of water into the saturated soil; and when dry, the soil would allow passage of water from the system into the soil. Such a system would keep the foliage dry and more resistant to fungi. Alternatively, the end of the tubing may be plugged using wicking material, which is shown in FIG. 4 as 51. The wick at the bottom of the pot would encourage growth since roots seek moisture. For example, the wicks used for candle-making, microfiber cords, and cotton rope may be used as the wicking material. Long, flexible porous materials may also be used to plug the tubing 50 in the planter 10 and distribute the water throughout the soil.

Modifications to the aforementioned apparatus are also envisaged. For example, the water container 40 does not have to fit into the inverted dome, but may be any water container with an exit port that connects to the tubing 50 and that can be supported by the dome. Furthermore, if the water container 40 has the shape and dimensions of the inverted dome 30, one could dispense altogether with the dome in this irrigation application, and place the water container 40 directly atop the cage. Other types of valves may also be used to regulate the flow of the water, and many other types of tubing or pipe may be used to transport the water from the water container 40 to the planter 10. For example, a rigid pipe that is part of the cage 20 may be used to transport the water. The valve may also be adjusted automatically by feedback that is based on electronic measurement of the moisture of the soil within the planter.

Another advantage of placing a water reservoir at the height of the dome is illustrated in FIG. 5. In the application that is shown there, the water reservoir serves not only as the source of water that is used to irrigate the planter, but it also may be used to deter animal pests. Thus, a water container 40 is connected to a drip chamber 56, a thumbwheel roller clamp 58, and tubing 50 as in FIG. 4, so that a plant 90 in the planter can be irrigated. But in addition, the water reservoir 40 is used to frighten an approaching animal pest, by showering the animal with water and by producing noise as a deterrent, as described below [Jason M. GILSFORF, Scott E. Hygnstrom, Kurt C. VerCauteren. Use of Frightening Devices in Wildlife Damage Management. Integrated Pest Management Reviews 1 (7, Mar. 2002): 29-45].

The deterrent mechanism shown in FIG. 5 is as follows. The animal pest 80 steps on an upper plate 81 that is connected by a hinge to a lower plate 82, with the lower plate secured to the ground. The animal's depression of the upper plate 81 causes the upper plate to approach the lower plate. As a result, magnets 83 on plates 81 and 82 attach to one another, pulling firmly on the cord 84. Pulling the cord 84 initiates a sequence of events leading to the creation of noise by a noisemaker 77 and to the release of water (possibly containing a chemical deterrent) onto the animal through the nozzle 73, as now described in detail. Note that if the gardener wanted to water the plant quickly with more water than can be provided conveniently through the drip irrigation tubing 50, (s)he can also deliberately pull the cord 84 and water the plant through the nozzle 73 (with the nozzle 74 closed).

Ordinarily, water in the water container 40 is prevented from escaping the container 40 (apart from the drip through tubing 50) by a valve 60 that is in its closed state. In the valve's closed configuration, a spring 62 keeps the disk 61 of the valve 60 seated, such that the valve orifice is blocked by the disk 61. But when outward force is applied to the stem 63 that is attached to the disk 61, the valve opens to allow water in the water-container 40 to enter the valve and then exit through the hose 72. That outward force may be exerted by a chain 64 that is wrapped around a sprocket wheel 65. The force is exerted by the weight 66 when the sprocket wheel 65 is free to rotate clockwise. However, the sprocket wheel 65 would not be free to rotate clockwise in the following two circumstances, in which case the valve 60 would remain in its closed state.

If the wing nut 67 is tightened against the immobile plate 68, the sprocket wheel 65 is clamped firmly against the immobile plate 68 such that the sprocket wheel 65 cannot rotate. The gardener would usually tighten the wing nut 67 when working around the apparatus, so as to prevent the inadvertent release of water from the water-container 40. When the gardener is finished working around the water-container 40, (s)he would then loosen the wing nut 67 so that water can then be released, but only after the animal 80 steps on the plate 81. The secondary mechanism that prevents water from being released makes use of the ratchet wheel 69 that is attached across its face to the face of the sprocket wheel 65. Clockwise rotation of the ratchet wheel 69 (and therefore of the sprocket wheel 65) is prevented by the pawl 70 when it engages one of the ratchet's teeth, as shown in FIG. 5. But the pawl 70 has an arm 71 that may be pulled by the cord 84 when the animal 80 steps on the plate 81, causing the pawl 70 to rotate in the clockwise direction. When that happens, the pawl 70 disengages from the ratchet wheel 69, thereby allowing the sprocket wheel 65 to rotate in the clockwise direction. The weight 66 then applies its force to the chain 64, which in turn applies the force to the stem 63 that is attached to the disk 61 of the valve 60. That force opposes the spring 62 that would otherwise keep the disk 61 of the valve 60 seated, and because the force of the weight 66 is greater than the opposing force of the spring 62, the valve 60 opens.

Once the valve 60 opens, water from the water-container 40 enters the hose 72 and is released from nozzles 73 and 74. The hose 72 preferably extends from the valve 60 to a position near the ground, so as to take maximum advantage of the hydrostatic pressure corresponding to the height of the water-container 40 relative to the ground. The shower of water emerging from nozzle 73 is intended to surprise the animal by squirting water towards the animal, possibly containing a chemical repellent, causing it to flee. The nozzle 73 may also be a low pressure misting/fogging nozzle that disperses droplets of water containing the chemical repellent. The water emerging from nozzle 74 turns a turbine 75. The axis 76 of the turbine 75 is attached to a ratchet noisemaker (gragger) 77, which produces a clicking and rattling noise that also frightens the animal. The duration of the shower and noise is limited by the amount of water in the water-container 40, but even so, residual water within the container should be sufficient to continue irrigating the plant until the gardener can replenish water in the container.

Other mechanisms known in the art may also be used to trigger the opening of the valve, such as mechanisms used to spring animal traps, or to flush a toilet. The mechanism shown in FIG. 5 will be relatively sensitive, such that that even a small animal may open the valve 60 by pressing on the plate 81, provided that the pawl arm 71 is long enough to be able to generate a large torque, and the pawl/ratchet interface is well lubricated. If the animal pest is expected to be large, a less sensitive triggering mechanism may be adequate, such that the force of the animal 80 stepping on the plate 81 may itself be used to counteract the force of the spring 62 in the valve 60. In that case, the cord 84 may be connected directly to the stem 63 of the valve 60 via a pulley that replaces the weighted chain and sprocket arrangement shown in FIG. 5.

An advantage of the mechanism shown in FIG. 5 is that it requires little or no maintenance, in contrast to mechanisms that use electrical components and a battery (which would have to be replaced periodically). Such an electrical mechanism was described in U.S. Pat. No. 5,009,192, entitled Animal Deterrent Apparatus, to BURMAN. It uses an infrared proximity sensor to sense the presence of the animal, which controls a valve attached to a conventional home water-sprinkler. Similarly, U.S. Pat. No. 5,892,446 entitled Wild Animal Deterrent Device, to REICH, describes the attachment of an electrical motion sensor to a source of noise (a radio). Such electrical mechanisms optionally could be used in place of the entirely-mechanical mechanism shown in FIG. 5. For example, a battery-powered motion sensor could detect the presence of the animal 80, and a linear electric actuator could then apply force to the stem 63 of the valve 60 in order to open the valve. If triggering of the motion sensor causes a warning noise to be produced a few seconds prior to opening of the valve, a gardener who inadvertently triggered the motion sensor will have time to disengage the unit to avoid being sprayed. The warning noise may be a recorded animal distress sound, which may frighten the animal and which may even attract predators that may also frighten the animal.

Whether the valve 60 in FIG. 5 is opened by mechanical or electrical mechanisms, the apparatus shown in that figure has advantages over animal deterrent systems that spray water from a home water-sprinkler (such as the above-mentioned U.S. Pat. No. 5,009,192). In the present invention, the amount of water that may be released is self-limited, so that the gardener cannot flood the lawn with a water-sprinkler that fails to shut off. Furthermore, the gardener may add a chemical repellent to the water in the container 40 to enhance the effectiveness of spraying the animal from the nozzle 73. This may be in addition to the fertilizer, compost tea, plant micronutrients and electrolytes, insect and fungus management solutions, and the like, that were noted above. An advantage of the present invention is the ease with which all such supplements may be added to the water container. That advantage is not present in other plant irrigation systems that simply make use of a home water supply inlet as the source of water for irrigation [U.S. Pat. No. 7,654,038, entitled Garden planter having integrated irrigation and illumination systems, to SIMMONS; U.S. Pat. No. 7,017,299, entitled Gardening cage apparatus and system, to SPEED et al.].

Chemical repellents include capsaicin (from peppers), the mothball chemical naphthalene, cinnamamide, ziram, derivatives of anthranilate, acetophenone, benzoate, anthraquinone, and others listed in: Larry CLARK. Review of Bird Repellents. Proceedings of the Eighteenth Vertebrate Pest Conference (1998). (R.O. Baker & A.C. Crabb, Eds.) Published at Univ. of Calif., Davis. 1998. Paper 6, pp 330-337. In the present application, capsaicin is not recommended because its simultaneous use in the plant irrigation solution would likely inhibit plant growth [H. KATO-NOGUCHI, Y. Tanaka. Effects of Capsaicin on Plant Growth. Biologia Plantarum Volume 47 (1, Jul. 2003): 157-159]. Many of the other chemical repellents are not preferred because they are toxic and/or because their effects on plant growth are unknown.

The preferred chemical deterrent for present purposes is cinnamamide, which is produced by amination of cinnamic acid (found in oil of cinnamon). Cinnamamide is safe if handled properly and not ingested, and it has medicinal uses [GUNIA-Krzyżak A, Pańczyk K, Waszkielewicz A M, Marona H. Cinnamamide Derivatives for Central and Peripheral Nervous System Disorders—A Review of Structure-Activity Relationships. ChemMedChem 10(8, Aug. 2015):1302-1325]. Furthermore, its simultaneous use in the plant irrigation solution would likely enhance plant growth [CHEN, Weiyan and Xu, Liangzhong. Growth-regulating Activity of Cinnamamide and Betaine Cinnamamide on Wheat. Advance Journal of Food Science and Technology 7(8, 2015): 584-588]. Cinnamamide is a chemical deterrent for birds, mammals, and invertebrates, which appears to work in different ways for different animals [GILL, E. L., Watkins, R. W., Gurney, J. E., Bishop, J. D., Feare, C. J., Scanion, C. B. and Cowan, D. P. Cinnamamide: A nonlethal chemical repellent for birds and mammals Repellents in Wildlife Management Symposium: Proceedings of the Second DWRC Special Symposium. National Wildlife Research Centre. 4101 LaPorte Avenue, Fort Collins, Colo. 80521. Paper 5, pp. 43-51 Aug. 8, 1995].

An additional feature of the device may also deter animal pests. That feature comprises painting nuts and bolts of the cage with a long-glowing phosphorescent paint in such a way that they resemble the eyes of a predator at night. Thus, some of the nuts and bolts of the cage may be separated from one another by a distance that approximates the distance between eyes of a predator such as a large cat. At night, these painted nuts and bolts will glow in the dark, and nocturnal animal pests may be wary of approaching what they perceive to be a predator. The preferred phosphorescent paint is one that can phosphoresce for 12 or more hours at night, after it has been energized by sunlight during the day [T. MATSUZAWA, Y. Aoki, N. Takeuchi, and Y. Murayama. A New Long Phosphorescent Phosphor with High Brightness, $SrAl_2O_4:Eu^{2+},Dy^{3+}$. J. Electrochem. Soc. 143 (5, Aug. 1996): 2670-2673; Bingfu L E I, Bin Li, Xiaojun Wang, and Wenlian Li. Green emitting long lasting phosphorescence (LLP) properties of $Mg_2SnO_4:Mn^{2+}$ phosphor. Journal of Luminescence 118 (2, Jun. 2006): 173-178]. An even more realistic deterrent may be made by painting realistic pairs of false eyes, such as taxidermy glass eyes, with the phosphorescent paint, and then attaching them to the apparatus. Such an approach may be superior to the use of fake snake and owl scarecrows that animals quickly learn to ignore.

In conclusion, prior art products do not necessarily possess the characteristics of the claimed apparatus, as follows. In the prior art that is discussed above in the background section, the lid for a cage is not necessarily "effortlessly detachable." In the prior art that is discussed above, the top of a cage is not necessarily bowl-shaped. In contrast to the dome disclosed here, the size of the apertures within the prior-art lid for a plant cage may not be suitable for the harvesting or washing of the fruit, vegetable, or leaf that is being gardened (e.g., small apertures for cherry tomatoes or blueberries or baby spinach). In fact, the selection of appropriately small apertures in the dome of the present invention may make it unsatisfactory for the intended purpose of a prior art cage-lid, because the prior art cage-lid would have apertures that are selected instead only to maximize sunlight and minimize construction material, provided that the selection is consistent with the need to deny entry of an animal pest. In contrast to the dome disclosed here, the material from which the lid for a cage is made may be toxic. In contrast to the dome disclosed here, the prior-art lid for a cage may not have the appropriate size or shape that allows it to be placed under a faucet in a sink for the rinsing of produce, or that allows it to be used as a strainer/steamer basket that is conveniently suspended within a selected commercially-available cooking pot. Thus, in the prior art, the lid for a plant cage is not inherently able to function like the dome that is disclosed here.

When viewed in the context of the whole process of growing, protecting, harvesting, rinsing, and cooking plant produce, the disclosed apparatus eliminates an element, namely, a separate cage-top or a separate harvesting/rinsing receptacle. Consequently, the omission of an element here (a separate harvesting/rinsing receptacle) but with retention of its function, is an indicia of the novelty of the apparatus. Evidently, the dome does not merely perform two different functions simultaneously, because in FIG. 2A the dome serves as a cover; but in FIGS. 2B and 2C the dome serves as a produce-receptacle; and the performance of these two functions are mutually exclusive. Furthermore, the dome may also serve as support for a water-container, as shown in FIGS. 4 and 5, and support for the reservoir for an animal deterrent device as shown in FIG. 5.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus; wherein said apparatus is configured to protect and to harvest produce from one or more cultivated plants; wherein said apparatus comprises a cage that contains apertures and a dome that contains apertures; wherein the cage comprises a lower opening and an upper opening; wherein the upper opening of the cage is attached to an edge of the dome, such that in a first configuration the attached dome covers the upper opening of the cage such that an apex of the dome points up, and in a second configuration the attached dome inverts such that the apex of the dome points down and uncovers the upper opening of the cage; wherein the dome apertures are adjustable in size, such that adjusted dome aperture sizes selected for the first configuration protect the plants from nuisance animals and also permit appropriate sunlight for the plants; and such that adjusted dome aperture sizes selected for the second configuration retain all produce harvested into the dome, when plants being harvested include, but are not limited to, any one of the following: tomato, pepper, basil, rosemary, blueberry, and baby spinach; wherein the cage and the dome unattached to one another are effortlessly attachable to one another; and wherein the cage and the dome attached to one another are effortlessly detachable from one another.

2. The apparatus of claim 1, further comprising a planter; wherein the planter has an opening through which said one or more plants can grow; and wherein the lower opening of the cage is directly attached circumferentially to said opening of the planter.

3. The apparatus of claim 2, wherein the planter, cage, and dome are configured for lifting as a single directly interconnected unit.

4. The apparatus of claim 3, further comprising handles and/or hooks that are configured to facilitate the lifting.

5. The apparatus of claim 2, wherein the planter and the cage unattached to one another are effortlessly attachable to one another; and wherein the planter and the cage attached to one another are effortlessly detachable from one another.

6. The apparatus of claim 1 wherein the dome has a concave or convex shape.

7. The apparatus of claim 1 wherein the dome detached from the cage is a colander and/or a steamer basket.

8. The apparatus of claim 1 wherein the height and/or circumference and/or shape of the cage is adjustable.

9. The apparatus of claim 1 wherein the size of the dome apertures is variable.

10. The apparatus of claim 1 wherein a lip of the dome has an adjustable circumference.

11. The apparatus of claim 10 wherein the dome is opened or closed using an umbrella-like mechanism.

12. The apparatus of claim 1 wherein a hinge attaches the cage to the dome.

13. The apparatus of claim 1 wherein the lower opening of the cage is attached to spikes that are configured to secure the cage into soil.

14. The apparatus of claim 1, wherein a hinged door is situated within the cage near the lower opening of the cage.

15. The apparatus of claim 1 further comprising an irrigation system.

16. The apparatus of claim 15 wherein the irrigation system comprises a water-container attached to a tube; and wherein a water-flow regulator is attached to said tube.

17. The apparatus of claim 1 further comprising a water-container and water temporarily contained therein, a valve, and a nozzle through which the water emerges upon opening of the valve, wherein the water emerging from the nozzle is sufficient to surprise a deer, mouse, or raccoon.

18. The apparatus of claim 17 further comprising a water-turbine and a noise-maker; wherein a rotation of the water-turbine by the water emerging from the nozzle is configured to activate the noise-maker.

19. The apparatus of claim 17 wherein a solution in the water-container contains one or more chemical additives that repel wildlife and that do not inhibit growth of the one or more plants.

20. The apparatus of claim 1 further comprising a phosphorescent paint that resembles a pair of eyes of a predatory animal at night.

21. The apparatus of claim 1, further comprising a planter; wherein the cage is configured to suspend the planter when the cage is lifted or suspended.

22. An apparatus; wherein said apparatus is configured to protect and to harvest produce from one or more cultivated plants; wherein said apparatus comprises a cage that contains apertures and a dome that contains apertures; wherein the cage comprises an upper opening; wherein the upper opening of the cage is attached to an edge of the dome, such that in a first configuration the attached dome covers the upper opening of the cage such that an apex of the dome points up, and in a second configuration the attached dome inverts such that the apex of the dome points down and uncovers the upper opening of the cage; wherein the dome apertures are adjustable in size, such that adjusted dome aperture sizes selected for the first configuration protect the plants from nuisance animals and also permit appropriate sunlight for the plants; and such that adjusted dome aperture sizes selected for the second configuration retain all produce harvested into the dome, when plants being harvested include, but are not limited to, any one of the following: tomato, pepper, basil, rosemary, blueberry, and baby spinach; wherein the cage and the dome unattached to one another are effortlessly attachable to one another; and wherein the cage and the dome attached to one another are effortlessly detachable from one another.

23. The apparatus of claim 22, further comprising a planter; wherein in the first configuration the cage encloses the planter.

* * * * *